Nov. 4, 1969 H. R. ROTTMANN 3,475,805

APPARATUS FOR POSITIONING ARTICLES ON SUBSTRATES

Filed June 26, 1967 6 Sheets-Sheet 1

INVENTOR
HANS R. ROTTMANN

BY J. B. Kraft
ATTORNEY

APPARATUS FOR POSITIONING ARTICLES ON SUBSTRATES

Filed June 26, 1967

Nov. 4, 1969 H. R. ROTTMANN 3,475,805

APPARATUS FOR POSITIONING ARTICLES ON SUBSTRATES

Filed June 26, 1967 6 Sheets-Sheet 4

3,475,805

APPARATUS FOR POSITIONING ARTICLES ON SUBSTRATES

Hans R. Rottmann, Poughkeepsie, N.Y., assignor to International Business Machines Corporation, Armonk, N.Y., a corporation of New York Filed June 26, 1967, Ser. No. 648,704
Int. Cl. B23p *19/04*
U.S. Cl. 29—203 33 Claims

ABSTRACT OF THE DISCLOSURE

Apparatus for positioning articles, particularly small articles such as semiconductor chips on substrates in preselected translational and rotary orientation. Conveying means receive the article and convey it past sensing means to placement means which transfer the article to the substrate. The sensing means determine the deviation in the article orientation from the preselected orientation and generate a signal indicating this deviation to positioning means which act on the placement means during the transfer of the sensed article to bring the article into the preselected orientation prior to the placement of the article on the substrate.

BACKGROUND OF THE INVENTION

Field of the invention

This invention relates to apparatus for positioning articles, particularly small articles such as semiconductor chips or substrates in preselected translational and rotary orientation.

The manufacture of miniature electronic devices requires the placement of minute elements such as semiconductor chips containing transistors or diodes onto assembly substrates such as printed circuit substrates. Because chips are almost microscopic in size, each measuring in the order of 0.05 inch square and, in more advanced technologies, have in the order of from 20 to 30 contacts which are only about 0.003 inch across, they cannot be handled by conventional automated assembly techniques. The problem is further complicated by the need for extreme accuracy and precision in positioning the chips in a translational and rotary orientation permitting the engagement of said chip contacts with an equal number of assembly contacts which are only up to 0.003 inch wide and 0.003 inch apart. Also, the semiconductor chips are extremely fragile and readily susceptible to damage.

In addition, the vast number of circuit substrates required in the manufacture of electronic equipment such as a digital computer demands that the chip positioning apparatus perform at relatively high speeds and with a high yield in order to maintain the high volume required in production. The large number of circuit substrates utilized in a single computer also demands uniformity in manufacture in order to increase the reliability of the final assembled equipment.

Prior art

The chip positioning apparatus described in copending applications S.N. 572,615, Aronstein et al. filed Aug. 15, 1966, now Patent No. 3,367,476 granted Feb. 6, 1968, and S.N. 459,179, Clark et al. filed May 27, 1965 are representative of prior art apparatus. In such apparatus, a preliminary crude or approximate orientation is made to provide chips with the selected surface up. This may be done, for example, with a vibratory feed bowl of the type described in the above applications. The apparatus also makes a rough translational orientation of the chips. After this preliminary orientation is made, the chip is picked up on a vacuum probe and carried first to a sensing station where the orientation of the chip is sensed by physical means with respect to a preselected rotary orientation. Then, the sensed chip is carried on the vacuum probe to orientation means which in response to a signal from the sensing station contact the chip and rotate the chip into the preselected rotary orientation while the chip is still retained on the vacuum probe. Apparatus for performing this orientation is described in U.S. Patent No. 3,312,325. The finally oriented chip is then placed on the substrate.

While the apparatus described has performed very well in positioning chips containing single transistors and, therefore having three contacts, the rapid advancement of electronics arts toward even greater microminiaturization has produced a requirement for apparatus for precisely positioning chips having from 20 to 30 contacts resulting from the incorporation of a plurality of transistors into a chip of approximately the same size as the original three contact chip. Because the number of contacts which must now be positioned has increased about tenfold, the permissible tolerances in positioning have been drastically reduced. While the prior art apparatus provides primarily for precise rotary orientation, the translational orientation of the chips with such prior art apparatus requires greater tolerances. It is therefore believed that as the number and density of contacts on the chip increases, the orientation problems of the prior art apparatus should also increase.

SUMMARY OF INVENTION

The present invention provides apparatus for placing an article such as a chip on a substrate in a precise preselected translational (X, Y) and rotary ($\phi$) orientation. The apparatus is sufficiently accurate to place a chip having dimensions in the order of 0.05 inch and having from 20 to 30 or more contacts onto a circuit assembly substrate on which the contacts are to engage an equal number of assembly contacts.

The apparatus of this invention comprises the combination of:

(1) Conveying means which receive the article from a dispensing means and convey the article to an article placement means;

(2) Sensing means along the path of the conveying means between the dispensing and placement means for sensing the deviation of the existing orientation of the conveyed article from a preselected orientation and generating a signal indicating the deviation in orientation;

(3) Article placement means receiving the sensed article from the conveying means and placing it on the substrate; the placement means have supporting means for retaining the article in its original orientation with respect to the placement means; that is, the article is held in a fixed position in the plane of orientation so that the positioning or the placement means will produce an attendant positioning or orientation of the article; and (4) Positioning means which in response to the signal from the sensing means move the placement means to bring the supported article movable therewith into the preselected orientation prior to placement of the article on the substrate.

The present invention also provides optical sensing means for sensing the deviation in orientation in combination with the conveying means, placement means and positioning means.

In addition, the present invention provides a unique combination of a rotary conveying means and placement means which provide for the placement of the article with a minimum of movement and handling after the sensing step. The rotary conveying means regularly interpose the sensed articles into the path of axial movement of the placement means perpendicular to the substrate. The placement means have means such as vacuum means for picking up and retaining the interposed article, after which the positioning means move the placement means to orient the sensed article, and the oriented article is then carried to and deposited on the substrate by the axial movement of the placement means before the next article is interposed in the path of axial movement.

Accordingly, it is the primary object of this invention to provide apparatus for automatically and precisely positioning elements such as semiconductor chips on assemblies in preselected translational and rotary orientations.

It is another object to provide apparatus for positioning any article on a substrate in preselected translational and rotary orientation where great precision is required in the orientation.

Another object is to provide apparatus for precisely positioning smaller workpieces at precise locations on larger workpieces in assembly operations.

It is still another object to provide the translational and rotary orientation with a minimum of movement and handling of the article after it has been sensed.

It is a further object to provide such positioning apparatus based upon optical sensing means.

The foregoing and other objects, features and advantages of the invention will be more apparent from the following more particular description of preferred embodiments of the invention as illustrated in the accompanying drawings.

THE DRAWINGS

PREFERRED EMBODIMENTS

Overall operation

The general nature of the structure and the overall mode of operation of the subject positioning apparatus will first be described, after which the specific structure of each of the several means or units will be explained in greater detail. For convenience in explanation, the operation of the apparatus will be described with reference to the placing of a semiconductor chip on an assembly substrate.

Figure 1B:
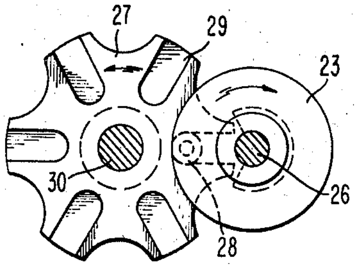
FIGURE 1B is an enlarged top view of the Geneva drive mechanism.
Figure 1:
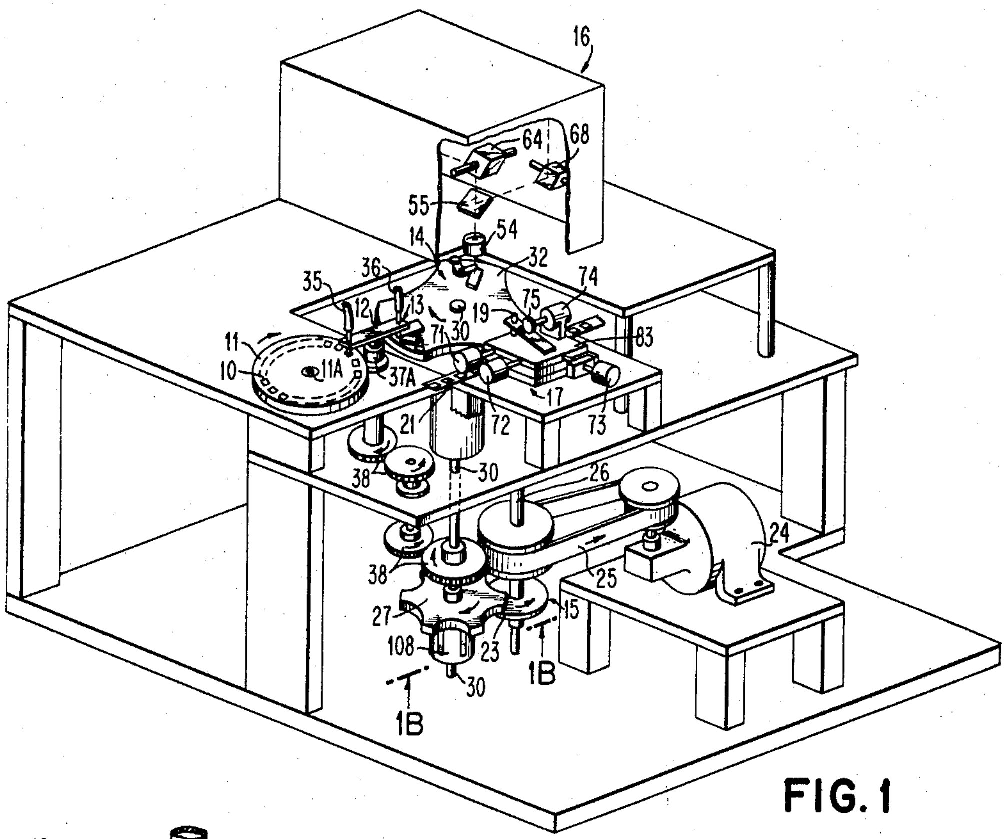
FIGURE 1 is a perspective view of the overall apparatus of the preferred embodiment of this invention with sections partially broken away to expose interior elements.

Referring to FIG. 1, chips 10 having been previously approximately positioned with respect to being right side up and facing in the right direction are carried by rotating dispenser 11 to dispensing station 12 where the chips are successively transferred by transfer means 13 to one of three radial chip supporting surfaces on rotary table 14. This table is indexed through a number of stops at fixed angular increments by Geneva drive mechanism 15. Among the stops are a stop at sensing means 16 where the deviation of the initial orientation of the chip from a preselected translation and rotary orientation is determined and a signal generated which indicates this deviation. This signal is transmitted to positioning means 17 at a chip placement station.

Figure 3:
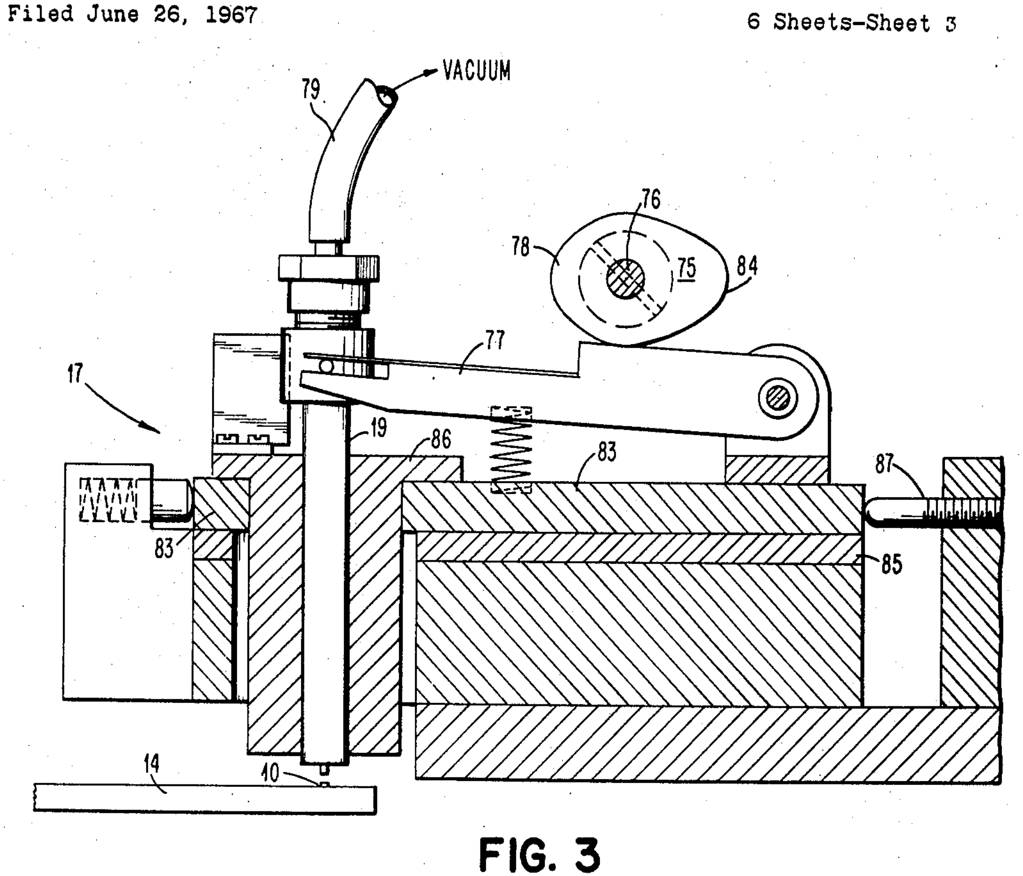
FIGURE 3 is a partial sectional view along line 3—3 of FIGURE 2.
Figure 3A:
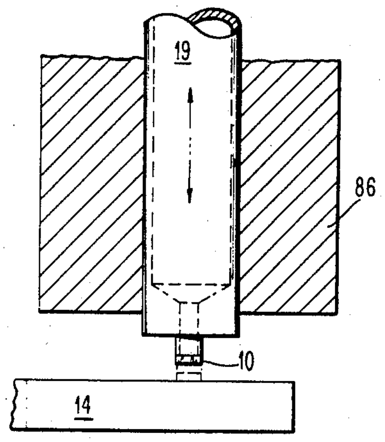
FIGURE 3A and FIGURE 3B are enlarged fragmentary views of FIGURE 3 to show the stages of the article placement.

Subsequent to sensing, the rotary table stops the chip at said placement station where vacuum probe 19 picks the chip up from the table; this may be seen more clearly by referring to FIGS. 3 and 3A. Then, while the chip is retained in a fixed orientation with respect to the probe, positioning means 17 acts upon the probe to move the probe and the retained chip into the preselected translational and rotary orientation based upon the signal generated by sensing means 16.

Figure 3B:
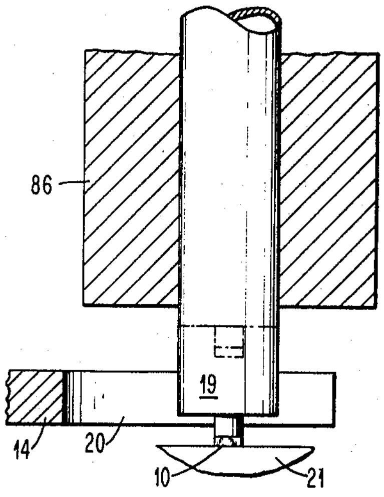

After orientation of the chip by the positioning means, table 14 is indexed to bring peripheral opening 20 in the table structure beneath vacuum probe 19 as shown most clearly in FIG. 3B. The probe then carries chip 10 through the opening 20 to assembly substrate 21 onto which the probe releases the chip and rises again to its initial position. The assembly substrate 21 may be carried to the placement position beneath the probe by any convenient method. One such method is a preforated conveyor tape 22 of the type described in U.S. Patent 3,312,325.

DISPENSING AND CONVEYING MEANS

The movement in the apparatus is controlled primarily by a Geneva drive mechanism which indexes a central shaft to rotate the table. Referring to FIGS. 1 and 1B, driver wheel 23 of the Geneva mechanism is driven by motor 24 through belt 25 which rotates shaft 26. The driver in turn drives Geneva wheel 27 by means of follower 28 which engages a series of slots 29 in the Geneva wheel to index the wheel and shaft 30 to which the wheel is affixed through a series of six stops at angular increments of 60° each for each complete 360° rotation of shaft 30.

Figure 2:
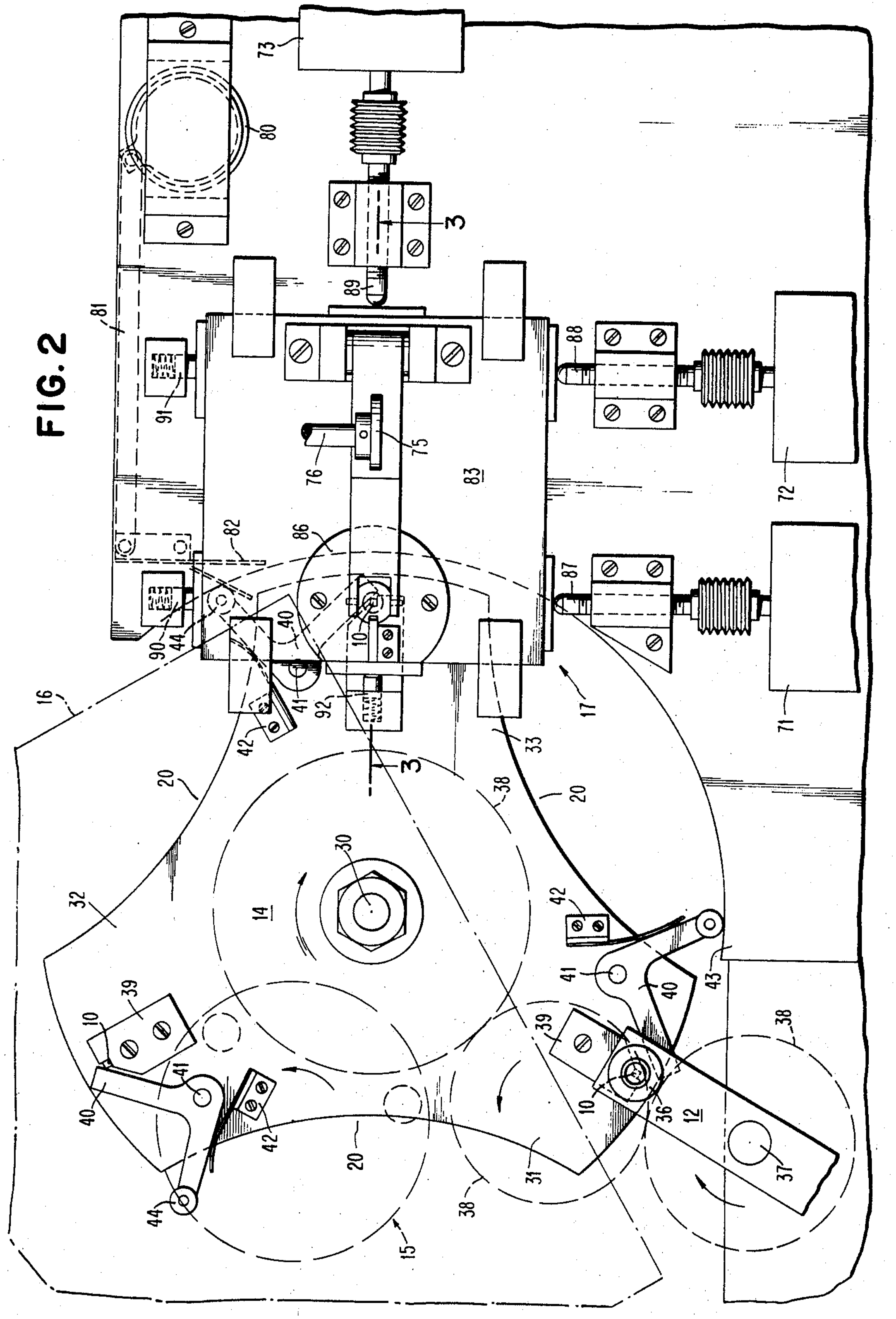
FIGURE 2 is a plan view of the rotary table and the article positioning and placing means.

Rotary table 14 which is rotated by shaft 30 consists of three radial arms 31, 32 and 33 on which the conveyed chips are seated. These arms alternate with three peripheral openings 20. As table 14 is indexed through a revolution, with each stop of the table, either all three arms 31, 32 and 33 are respectively at the dispensing, sensing, and placement stations with the retained chips in operative registration with said station, or, alternatively, all of the three peripheral openings 20 are at said three stations. The latter alternative condition permits the placement of the chip at placement station 18 through an opening 20 in the table. In FIGS. 1 and 2, the first of the two possible alternative conditions in which the arms 31, 32 and 33 are at the stations, is shown.

While the specific embodiment discloses a six stop Geneva drive mechanism, it will be understood that a three stop Geneva indexing mechanism may be used without alternative stops at opening 20 for the placement of the chip. In the latter case, the placement of the chip at said placement station could be made while opening 20 was moving across the placement point before the next radial arm was interposed in the path of the placement mechanism.

Figure 1A:
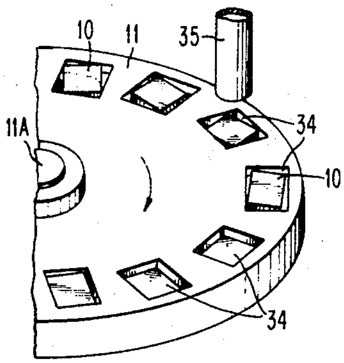
FIGURE 1A is an enlarged fragmentary perspective view of the article dispensing means.

With respect to the placement and the retention of the chip on the rotary table, the chips 10 are fed to the rotary table by means of a dispenser 11 as shown in FIGS. 1 and 1A. The chips may be loaded into the recesses 34 of dispenser 11 by any convenient method which would provide a preliminary orientation of the chip so that they face in the right direction and are right side up. Since the recesses 34 are large enough to readily receive the chips, the preliminary placement or orientation of the chip in the dispenser recesses may be conveniently done manually.

Independent motor means, not shown, step rotary dispenser 11 by indexing shaft 11A to bring chips successively into pickup position with respect to vacuum transfer probe 35. Transfer means 13 comprises two vacuum transfer probes 35 and 36 which are coupled to a common source of vacuum (not shown). Switching means switch the source of vacuum so that when the vacuum is on one of the probes, it is off the other. In the position shown in the figures, the vacuum would be on probe 35 which has picked up a chip and off probe 36 which has released a chip to the rotary table. The probes 35 and 36 are supported on rotatable bar which is mounted on rotatable shaft 37. Shaft 37 is coupled to shaft 30 by suitable gearing 38 to provide a movement of probe 35 carrying a chip to the dispensing position with respect to table 14 in synchronization with the arrival of the next radial arm of the table which is to receive a chip from the dispensing means. During the same time, transfer probe 36 moves back to the pickup position with respect to dispensing means 11. At this point, shaft 37 is reciprocated through one down and up cycle within sleeve 37*a* by independent motor means not shown. On the down stroke probe 36 will contact a new chip on dispenser 11, and the chip beig carried on probe 35 will contact the receiving radial arm of rotary table 14. The completion of the down stroke activates the switching of the vacuum source so that the vacuum is removed from probe 35 permitting it to release the carried chip onto table 14 and the vacuum is again applied to probe 36 permitting it to pick up the new chip. The up stroke disengages probe 35 and probe 36 carrying the new chip from the table and dispenser respectively.

Considering now the chip retention means on rotary table 14, each of radial arms 31, 32 and 33 is equipped with means for receiving the chip and retaining the chip in a fixed position. The chip retaining means as shown in FIGURE 2 include a right angle abutment 39 for receiving the chip and a lever arm 40 which is pivotly urged about pivot 41 by spring 42 into engagement with chip 10 to fix its position with respect to the right angle of the abutment. At the chip dispensing station 12, cam means 43 acts on follower 44 of arm 40 to hold arm 40 out of engagement with the chip during the deposition of the chip at the dispensing station. As table 14 rotates away from the dispensing station, follower 44 will move out of engagement with cam 43 to permit arm 40 to be urged into engagement with chip 10 by means of spring 42. The chip is retained in this fixed position through the sensing station and until retaining arm 40 is again released at the placement station in a manner which will be hereinafter described.

SENSING MEANS

Figure 4:
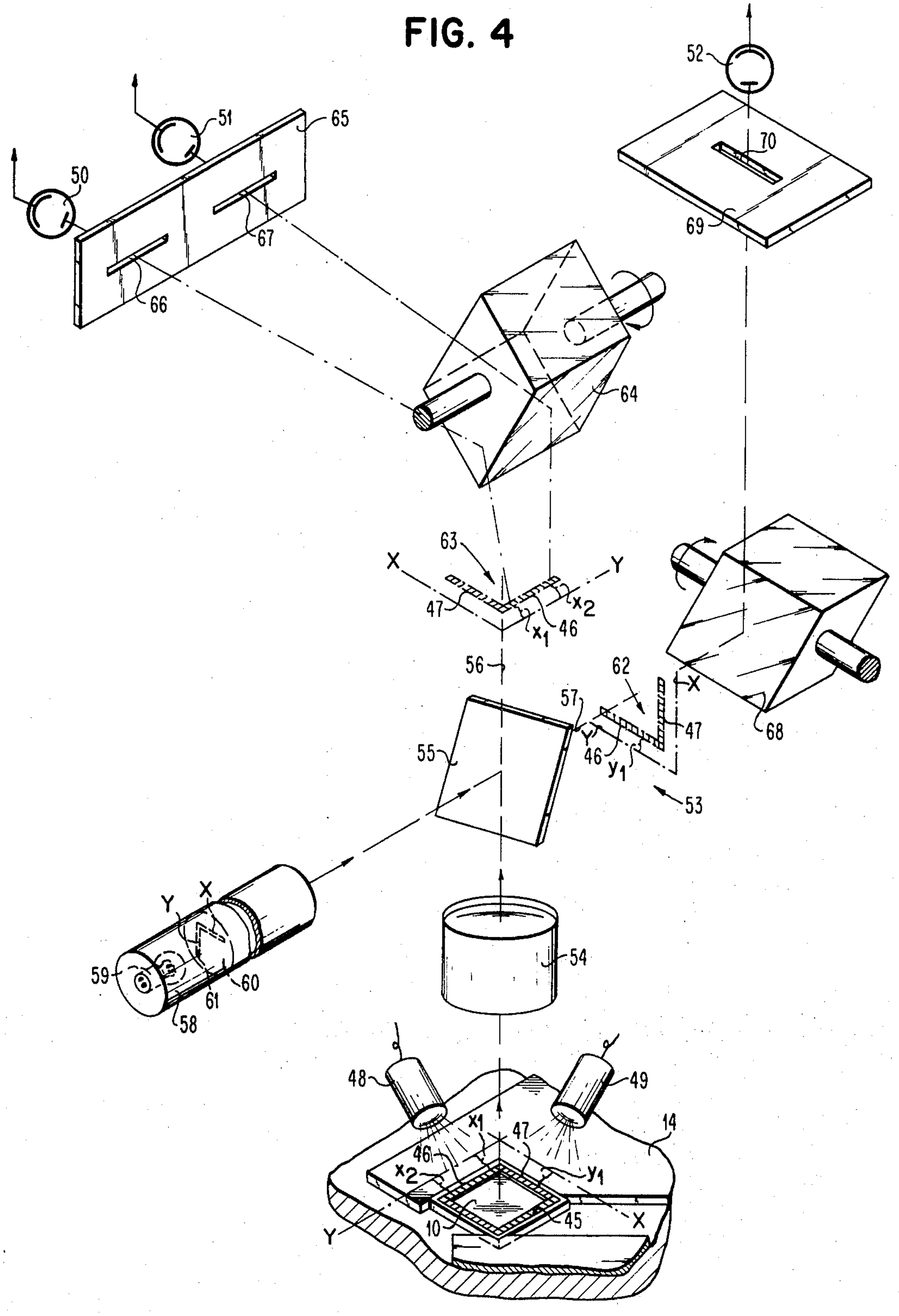
FIGURE 4 is a diagrammatic perspective view of the optical sensing means in the preferred embodiment.

The chip retained on the rotary table is then carried by the indexed rotary table to the sensing means which may be any means for sensing deviation of the chip from the preselected translational and rotary orientation and particularly any means for determining the perpendicular distances of first and second optically detectable reference points on said chip from the first of a pair of coordinate reference axes, on which first axis, said reference points are to be positioned in the preselected orientation and to determine the perpendicular distance of a third reference point on said article from the second coordinate reference axis on which second axis the third reference point is to be positioned in the preselected orientation. Further, the sensing means should generate signals indicative of the three determined distances. The three above-mentioned distances may be determined by any optical sensing means capable of scanning along the respective paths of the perpendiculars of the three reference points onto the respective coordinate axes upon which these reference points are to be placed. FIG. 4 shows one such optical sensing system which is used in the preferred embodiment of this invention.

With respect to FIG. 4, chip 10 is shown in its position with respect to table 14 at the sensing station. Chip 10 contains a peripheral arrangement of reflective contact pads 45. In the preselected orientation, chip 10 is to be positioned so that leading edge 46 of one line of pads will be positioned on the Y axis and leading edge 47 of a second pad line is to be positioned on the X axis. The sensing apparatus is arranged to detect the deviation of edge 46 from the Y axis and edge 47 from the X axis. This can be accomplished by determining the perpendicular distances of two points on leading edge 46 from the Y axis and one point on the leading edge 47 from the X axis. Illumination sources 48 and 49 are directed at leading edges 46 and 47 respectively to form reflective images of these edges. For best results, the light from these sources is directed at an acute grazing angle to the surface of the pad, preferably at an angle of incidence of from 75° to 85° with respect to the pad surface. Photocells 50 and 51 are adapted to sense the distances of two reference points on leading edge 46 from the Y axis and to transmit signals indicative of these distances. Photocell 52 is adapted to sense the distance of one reference point on leading edge 47 from the X axis and to transmit a signal indicative of this distance. Optical system 53 is adapted to scan along the perpendicular paths from the two reference points on leading edge 46 to the Y axis and from the reference point on leading edge 47 to the X axis and to respectively reflect the first two scanned paths to photocells 50 and 51 and the last scanned path to photocell 52 so that these photocells may detect the scanned distances of the three paths.

Any known scanning system may be used to accomplish this scanning operation. For example, a very basic system in which the three photocells are respectively moved along scanning paths on a projected image of the configuration to be scanned may be used. Such an apparatus is described in a copending application filed by R. Brunner et al. entitled "A Method and Apparatus for Positioning Objects in Preselected Orientations," now U.S. Patent No. 3,466,514, which was filed on or about the filing date of the present application.

In the present structure, the reflective images of leading edges 46 and 47 are projected by lens system 54 to beam splitter 55 which transmits and reflects the image along, respectively, optical paths 56 and 57. Simultaneously, referencing means 58 projects onto said beam splitter a light image of the X, Y coordinate reference axes. Illumination source 59 is applied to plate 60 having formed therein aperture 61 in the reference axes configuration. The image-forming light rays from 61 are projected through suitable lens means onto the beam splitter 55 which transmits and reflects the rays forming the image of the reference axes respectively along optical paths 56 and 57. Thus there are transmitted along each of optical paths 56 and 57 both the images of leading edges 46 and 47 as well as the images of the coordinate axes.

Solely for purposes of illustration, the projected image of the chip including leading edges 46 and 47 is disposed along optical path 57 at position 62 referenced against the image of the X, Y coordinate axes. Likewise the other split image of chip 10 including leading edges 46 and 47 is shown along optical path 56 at point 63 and also referenced against the image of the X, Y coordinate axes. Considering now the scanning operation, as rotating mirror 64 rotates in the direction shown there will be reflected across scan plate 65, through apertures 66 and 67 respectively to photocells 50 and 51 the scan images along paths $x_1$ and $x_2$ respectively from the Y coordinate reference axis to leading edge 46. Thus, both photocells 50 and 51 will detect a light image when the scan crosses the Y axis and photocell 50 will receive a light image when the scan along path $x_1$ hits leading edge 46. Likewise photocell 51 will receive a light image when the scan along path $x_2$ hits leading edge 46.

In a like manner, as rotating mirror 68 moves in the direction shown, there will be reflected across scan plate 69 through aperture 70 to photocell 51 the image along path $y_1$ first the X coordinate reference axis and then leading edge 47. Thus photocell 52 will receive a first light image when the X axis is crossed and then a second light image when leading edge 47 is crossed.

The points at which paths $x_1$ and $x_2$ cross leading edge 46 and point $y_1$ crosses the leading edge 47 should be considered as the three previously mentioned reference points, and the distances $x_1$ and $x_2$ as distances of the first two reference points from the Y axis and the distances $y_1$ as the distance of the third reference point from the X coordinate axis. The sense distances $x_1$, $x_2$ and $y_1$ are respectively transmitted as signals from photocells 50, 51 and 52 to servomotors 71, 72 and 73 of chip positioning means 17 at the chip placement station 18 by control means which will be hereinafter described in greater detail. Then, when the sensed chip arrives at placement station 18, servomotors 71, 72 and 73 will move positioning means 17 to offset distances $x_1$, $x_2$ and $y_1$ and thus orient the chip in the preselected orientation.

Also, it should be understood that the light image reference axes to which the images of leading edges 46 and 47 are compared by the scanning means need not be images of the actual reference axes on which the chips are to be placed. The light image may be of a second pair of axes which will be referred to as X′ and Y′ or the sensing axes. X′ and Y′ should be respectively parallel to the X, Y axes on which the chip is to be placed and at fixed distances from the X, Y axes. Thus, when the distances of the three reference points from the X′, Y′ axes are sensed the sensing apparatus may be readily adapted to adjust the scanned distances of the three reference points on leading edges 46 and 47 from the X′, Y′ sensing axes by the respective fixed distances between the X′, Y′ axes and the X, Y reference coordinate axes to determine the actual respective distances of the three reference points from the coordinate reference axes.

CHIP PLACEMENT MEANS

After the sensing station, the sensed chip is then conveyed by the rotary table to the chip placement station. At this station the chip is picked up by the placement means and positioned while held by the placement means before it is placed on the substrate. For convenience in description, the chip positioning and the chip placement will be dealt with separately. Accordingly in the following description of chip placement, it will be briefly noted when the chip is positioned while carried on the placement means. There will be a subsequent more detailed description of the positioning means.

The chip placement operation may be best understood with reference to FIGURES 2 and 3, 3A and 3B. When the chip is stopped at placement station 18, motor 74 is activated to rotate excentric cam 75 via shaft 76 for one half a cycle or 180°. During the first 90° of this half cycle cam 75 acts upon spring bias lever arm 77 to move axially reciprocatable vacuum probe 19 in a downward direction toward the chip. When point 78 on cam 75 engages lever arm 77, the probe 19 engages the chip. At this point vacuum is applied to probe 19 via conduit 79. This vacuum acts to retain the chip on probe 19. Simultaneously with the engagement of chip 10 by the probe, solenoid 80 is activated, and by means of link 81 urges lever 82 against follower 44 on chip retaining arm 40 to bring retaining arm 40 out of engagement with the chip. The chip being no longer retained on the table is now free to move with the vacuum probe. The probe raises the chip during the second 90° of the half cycle of cam rotation to a position above the table as shown in FIGURE 3A. The chip is held in this position with respect to the table by probe 19 while servomotors 71, 72 and 73 apply linear forces to platform 83 within which probe 19 is slidably mounted. These three linear forces will act to position the probe and consequently the chip in the preselected orientation based upon signals from sensing means 16. The positioning operation will be subsequently set forth in greater detail.

While the chip is being held in the position indicated in FIG. 3A, the rotatable table is indexed through an additional stop to bring peripheral opening 20 and table 14 to a position beneath probe 19. This is shown in FIG. 3B with the initial position of the probe-held chip being shown in dotted lines. At this point, motor 74 is activated to rotate cam 75 by means of shaft 76 180° to the completion of one full cycle of rotation. During this second half cycle when point 84 is in contact with spring bias lever arm 77, probe 19 carrying chip 10 has passed through opening 20 in table 14 and has carried chip 10 into engagement to the substrate 21 as shown in FIG. 3B. At this point, the vacuum being applied to probe 19 is turned off automatically by switching means, and chip 10 is released from probe 19. Probe 19 at the end of the full revolution of cam 75 is again at the starting position where it awaits the arrival of the next chip at the placement station when table 14 is indexed through its next stop.

CHIP POSITIONING MEANS

As previously mentioned, the actual positioning of the chip into the preselected translational and rotational orientation takes place while the chip is being retained by probe 19 by the placement means in the position shown in FIG. 3A. The positioning means for moving the chip into the preselected translational and rotary orientation which will be described in this preferred embodiment is the positioning apparatus disclosed and claimed in the copending commonly assigned application filed by R. Brunner et al. on or about the filing data of the present application entitled "A Method and Apparatus for Positioning Objects in Preselected Orientation." It should be understood that the actual method for positioning the chip or article in the preselected orientation is not critical to the practice of the present invention, and that any known apparatus for achieving such an orientation in response to signals from a preceding sensing station may be used.

Figure 5:
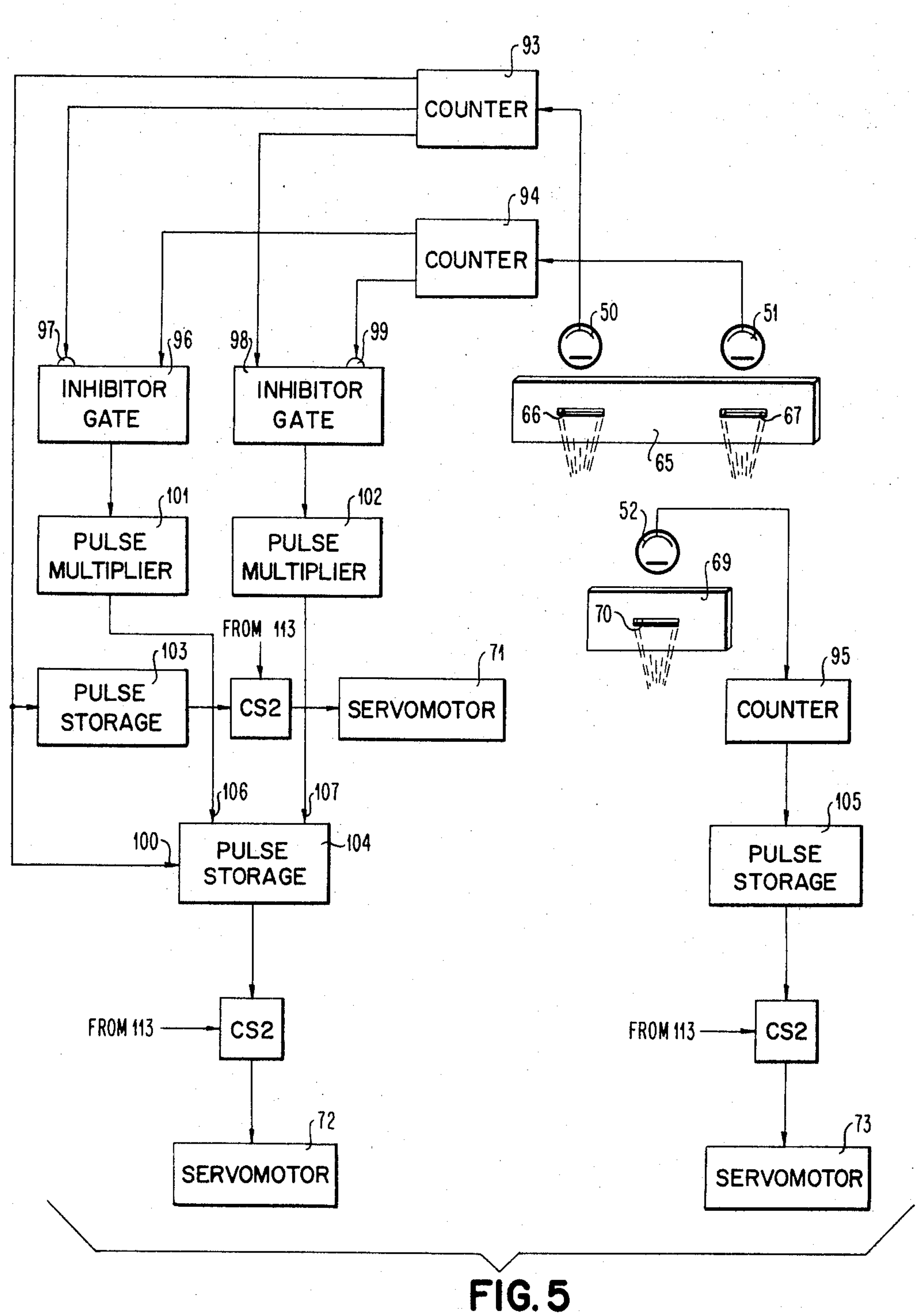
FIGURE 5 is a diagram of the control means for the positioning means showing the control logic.

The operation of the positioning means may be best understood with reference to FIGS. 2, 1 and 3. Platform 83 rests on support 85 so as to be translationally and rotationally movable. Probe sleeve 86 is affixed to platform 85. Probe 19 is slidably mounted within sleeve 86. When the chip and probe are in the position shown in FIG. 3A, servomotors 71, 72 and 73 effectively rotate screw shafts 87, 88 and 89 in response to applied signals previously generated by photocells 50, 51, and 52 respectively (shown in FIG. 4) and stored in storage means 103, 104 and 105 (FIG. 5). The three screw shafts in operative association with spring loaded plungers 90, 91 and 92 which are repectively coaxial with and urge platform 83 against said three screw shafts provide the means for applying three linear forces to position the platform and consequently the probe and chip.

In the initial static position of the positioning apparatus, the forces applied to platform 83 by shaft 87 and associated spring plunger 90, shaft 88 and associated spring plunger 91 and shaft 89 and associated spring plunger 92 are in balance and consequently there is no movement of the platform. Let us now suppose that the sensing apparatus shown in FIG. 4 at the preceding sensing station has sensed the deviation $x_1$, $x_2$ and $y_1$ respectively from the Y and X coordinate axes. A signal indicative of the deviation $x_1$ has been transmitted from photocell 50 to servomotor 71 by way of the control circuit shown in FIG. 5 and storage means 103, the operation of which will subsequently be described in greater detail. Likewise, signals indicative of the deviations $x_2$ and $y_1$ have been respectively transmitted to servomotors 72 and 73 by photocells 51 and 52 by way of storage means 104 and 105. Shafts 87 and 89 are respectively so positioned relative to platform 83 and probe 19 that the axes of shafts 87 and 89 will pass through the projection of chip 10 onto the plane of these axes. The axis of shaft 87 preferably passes through the reference point marked by the intersection of leading edge 46 with line $x_1$ on the chip and the axis of shaft 89 preferably passes through the reference point formed by the intersection of leading edge 47 and line $y_1$.

Now, in order to bring the chip into the preselected orientation wherein leading edge 47 is on the X coordinate axis and leading edge 46 is on the Y coordinate axis shown in FIG. 4, the following shaft movements take place:

Servomotor 71 rotates shaft 87 through the number of turns necessary to achieve the retraction of shaft 87 for the distance $x_1$ along its axis causing spring plunger 90 which urges the platform against the shaft to move the platform and consequently the retained chip for the distance $x_1$.

Servomotor 73 rotates shaft 89 for the turns necessary to extend shaft 89 for the distance $y_1$ along the shaft causing the movement of platform 83 and the retained chip through the distance $y_1$.

Servomotor 72 rotates shaft 88 sufficiently to move shaft 88 axially for a distance determined by the following formula:

$$\text{Distance} = x_1 + \frac{A}{a}(x_2 - x_1)$$

where $x_1$ and $x_2$ have already been described with respect to FIG. 4, A is the perpendicular distance between the axes of shafts 87 and 88 and $a$ is the distance along leading edge 46 between the intersections of $x_1$ and $x_2$ with the leading edge. If the distance calculated by the formula is positive shaft 88 is moved axially in the same direction as shaft 87 for the distance. If the formulated distance is negative, shaft 88 is moved axially in the direction opposite to that of 87.

The three linear forces thus applied to platform 83 and retained chip 10 will bring chip 10 into the preselected translational and rotary alignment with respect to coordinate axes X and Y. The positioned chip may now be placed by the previously described placement means in its preselected orientation upon the substrate.

CONTROL MEANS AND CIRCUITS

With reference to FIGS. 4 and 5, the following deschiption covers a control means for transmitting the information sent by photocells 50, 51 and 52 and for utilizing this information to move servomotors 71, 72 and 73 in the previously described manner.

In a given scanning operation, the light image of the Y coordinate axis transmitted to photocells 50 and 51 through apertures 66 and 67 results in signals from these photocells respectively applied to counters 93 and 94. The subsequent light image of the leading edge 46 transmitted to photocell 50 which is scanning path $x_1$ results in a signal to counter 93 which stops the count. The number of pulses between the two signals which is indicative of the distance $x_1$ is fed from counter 93 to servomotor 71 by way of pulse storage means 103 which stores the pulse count until the chip being sensed reaches the positioning means. Based upon this input, servomotor 71 acts to move shaft 87 for the distance $x_1$ during the positioning operation which has been previously described. Similarly, the transmission of the image of leading edge 46 to photocell 51 results in a signal to counter 94 ending the count. The number of pulses between the two signals is indicative of the distance $x_2$.

At the same time, the image of the X reference axis followed by the image of leading edge 47 is transmitted to photocell 52 through the opening 70 and results in a count on counter 95 indicative of the distance $y_1$. This pulse count is fed to servomotor 73 by way of storage means 105 which stores the pulse count similarly to storage means 104. Servomotor 73 then acts to move shaft 89 for a distance of $y_1$ in the positioning operation.

Counters 93 and 94 operate at the same fixed frequency and in synchronism with each other. One output of counter 94 is applied to inhibitor gate 96. An output of counter 93 is applied to inhibitor input 97 of gate 96. As long as pulses are applied to inhibit input 97, gate 96 will not pass pulses applied from counter 94. Thus, gate 96 will only pass the number of pulses indicative of the distance by which $x_2$ exceeds $x_1$ or $(x_2-x_1)$. If $x_1$ exceeds $x_2$, in which case the expression $(x_2-x_1)$ would be negative, gate 96 would pass no signal. With respect to inhibitor gate 98, a second output from counter 94 is applied to the inhibit input 99 of the gate. Another output of counter 93 is applied to gate 98. As long as pulses are applied to the inhibit input 99, gate 98 will not pass pulses applied from counter 93. Thus gate 98 will only pass the number of pulses indicative of the distance by which $x_1$ exceeds $x_2$ or opposite to gate 96, gate 98 will pass pulses only when the expression $(x_2-x_1)$ is negative. Accordingly, when $x_2$ is greater than $x_1$, only gate 96 will pass the number of pulses by which the scan of $x_2$ exceeds that of $x_1$, and when $x_1$ exceeds $x_2$, only gate 98 will pass the number of pulses by which the scan of $x_1$ exceeds that of $x_2$.

As previously described with respect to the positioning operation, servomotor 72 controls the application by shaft 88 of an axial linear force to platform 83 over a distance which shall be referred to as $d$ determined by the formula, $$d = x_1 + \frac{A}{a}(x_2 - x_1)$$

This is accomplished as follows:

The signal from counter 93 which has been previously described as being applied to servomotor 71 is also applied directly to pulse storage 104 through input 100. This signal is a pulse count indicative of the distance $x_1$. When $x_2$ exceeds $x_1$ and the expression $x_2-x_1$ is positive, gate 96 passes the number of pulses by which the scan of $x_2$ exceeds that of $x_1$. The pulse output of gate 96 is applied to pulse multiplier 101 which multiplies the number of pulses by the constant $A/a$, the determination of which has been previously described. The output of pulse multiplier 101 which is indicative of the distance $$\frac{A}{a}(x_2 - x_1)$$

in the above expression is applied to input terminal 106 of pulse storage 104 which adds the pulse count at input 106 to the pulse count at input 100 to give a stored positive pulse count indicative of the distance $$x_1 + \frac{A}{a}(x_2 - x_1)$$

On the other hand, if $x_1$ exceeds $x_2$ and the expression $(x_2-x_1)$ is negative, only gate 98 passes the number of pulses by which the scan of $x_1$ exceeds that of $x_2$. The pulse output of gate 98 is applied to pulse multiplier 102 which multiplies the number of pulses by the constant $A/a$ only when this expression is negative. The output of pulse multiplier 101 is applied to input terminal 107 of pulse storage means 104 which subtracts the pulse count at input 104 from the pulse count at input 100 to give a stored pulse count indicative of the distance $$x_1 + \frac{A}{a}(x_2 - x_1)$$

where the expression $(x_2-x_1)$ is negative. In this case if $x_1$ exceeds $$\frac{A}{a}(x_2 - x_1)$$

the pulse count in storage means is still positive. However, if $$\frac{A}{a}(x_2 - x_1)$$

exceeds $x_1$, the pulse count in storage means 104 is negative. Thus, irrespective of whether there has been a positive input at terminal 106 or a negative input at terminal 107, pulse storage means 104 stores a pulse count indicative of the expression $$x_1 + \frac{A}{a}(x_2 - x_1)$$

This stored pulse count is applied to servomotor 72 during the positioning operation. In response to a positive pulse count input from pulse storage 104, servomotor 72 acts to move shaft 88 in the same direction as shaft 87 moves for the distance, $$x_1+\frac{A}{a}(x_2-x_1)$$

On the other hand, if the pulse count is a negative one, servomotor 72 acts to move shaft 88 for the distance $$x_1+\frac{A}{a}(x_2-x_1)$$

in the direction opposite to the movement of shaft 87.

In the previous discussion of the action of the servomotors in response to signals from the sensing means, the action of the servomotor has been described as taking place during the positioning operation. In the embodiment of the invention described, the positioning operation does not take place before the sensed chip has been rotated at least 120° from the sensing station to the placement station and has been picked up by the placement apparatus. During this period, the sensed information which has been fed to the three pulse storages 103, 104 and 105 during the sensing step is in effect stored therein until the positioning operation is to be carried out in the sequence. At this point the servomotors are switched on automatically by means of switch CS2 in a manner to be hereinafter described with respect to the timing sequence of the apparatus. This permits the stored pulse counts to be fed to the respective servomotors. The motors move through their positioning cycle and act out the sensed information.

With respect to the sensing means and the positioning means, it should be noted that the present invention is not limited to the use of the sensing means or the positioning means previously described in the preferred embodiment. Any combination of sensing means which detects a deviation from a preselected translational and rotary orientation and positioning means for moving the article to the preselected translational and rotary orientation may be used in this invention. In such combinations, the sensing operation should be performed at a station separate from the positioning operation. Instead of the sensing and positioning apparatus of the preferred embodiment, the sensing and positioning apparatus described in U.S. Patents 3,207,904 and 3,038,369 as well as in the present inventor's copending application S.N. 617,674 filed Feb. 21, 1967 may be used.

TIMING SEQUENCE

The sequence of operations performed by the apparatus in the preferred embodiment is related to the rotation of shaft 30 which is indexed by the Geneva drive mechanism through a series of six stops for one complete 360° revolution. As shown in FIGS. 1 and 1B, at alternate 60° stops, either all three radial arms 31, 32 and 33 are at the three stations with the articles or chips retained on each of said arms in operative registration with the respective dispensing sensing and placement stations or all three radial arms are between stations. In this latter alternative, all three peripheral openings 20 occupy the stations. The primary purpose of this alternate series of stops is to permit the placement onto the substrate beneath the table of the last chip being retained on the placement means. It should be noted that this alternative stop may be eliminated by timing the apparatus so that the placement of the last retained chip by the placement means may be carried out during the period when opening 20 is passing under placement station 18. In such a case, it would be necessary to index rotary table 14 through only three stops of 120° for each complete rotation; at each of these stops all three radial arms of the table would be at the three stations.

With respect to the apparatus of the preferred embodiment, the coordination of the sequence of steps will be described with reference to FIG. 6, a diagrammatic illustration of the commutator switching means on shaft 30 which controls the electrical switches activating the various operations. The rotation of shaft 30 controls the sequence of steps to be performed. With the exception of the rotation of dispensing transfer means 13, the rotation of which is coordinated with the rotation of shaft 30 by a gear arrangement, all of the other sequential operations are controlled by commutator 108 on shaft 30 which rotates with shaft 30 to make the contacts to close the switches that activate the sequential operations.

The commutator has three peripheral contacts 109, 110, 111 of conductive material, equally spaced 120° apart. During one revolution of the commutator which is equivalent to one revolution of rotary table 14, each of the three contacts will engage a series of brushes 112, 113, 114 and 115. As each of the series of brushes is contacted, a switch will be closed which will activate one or more sequential operations. Thus, in one revolution of the table 14, the entire series of operations will be repeated three times.

Figure 6:
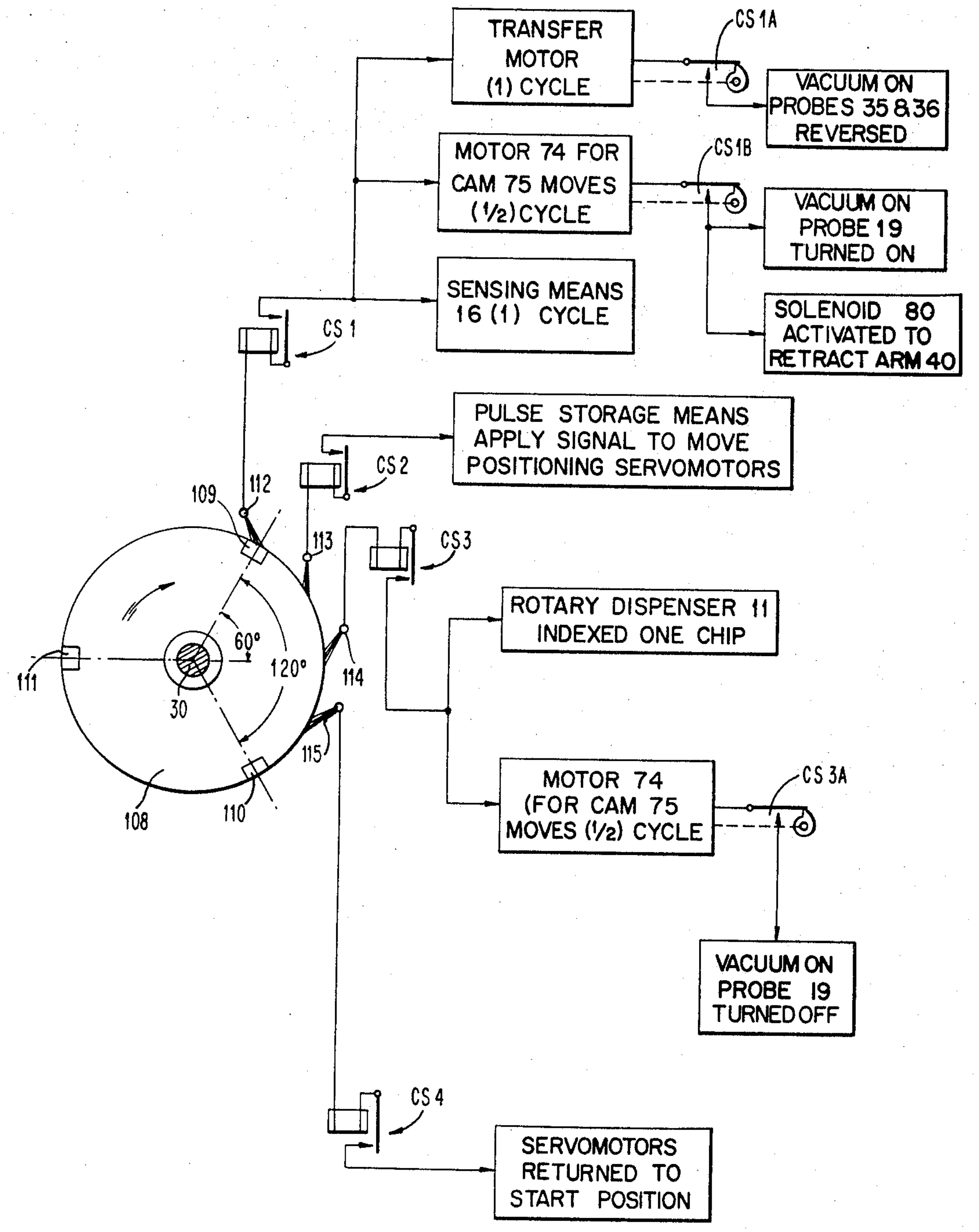
FIGURE 6 is a diagrammatic view of the timing switching means for maintaining the sequence of operation of the apparatus.

In following through one series with reference to FIG. 6, the rotation of the commutator contacts is synchronized with that of rotary table 14 (FIG. 1) so that when the rotary table is at the alternate stops in which the three radial chip retaining arms are at the stations, one of the contacts which in the illustration is 109 engages brush 112. This closes switch CS1 which activates the transfer motor to reciprocate shaft 37 for one "down and up" cycle. At the end of the down stroke, shaft 37 closes switch CS1A which switches the vacuum on dispenser probes 35 and 36 so that one can remove a chip from dispenser 11 and the other can deposit a chip on the radial arm of table 14 which is at the dispensing station.

Simultaneously, switch CS1 activates motor 74 to rotate excentric cam 75 in the placement means ½ revolution to move vacuum probe 19 in the "down-up" stroke necessary to pick up a sensed chip from the radial arm of table 14 which is at the placement station. At the end of the down stroke or after about a ¼ revolution of motor 74, switch CS1B is closed. This concurrently activates the vacuum on probe 19 as well as solenoid 80 which retracts arm 40 which is retaining the chip to be picked up by probe 19 so that probe 19 can pick up the chip.

Simulaneosuly, with the activation of the transfer motor and the placement means switch CS1 activates the sensing means 16 for one cycle to sense the chip which is retained in the radial arm of the table at the sensing station.

After the stopped table has begun again to rotate, moving contact 109 engages brush 113 to close the switch CS2. The closing of this switch, as indicated in FIG. 5, causes the pulse counts respectively stored in storage means 103, 104 and 105 to be fed to servomotors 71, 72 and 73 activating these motors to position the placement means and the chip held on the placement means into the preselected orientation.

When the rotary table has made its next stop at the alternative condition wherein the three table openings are at the three stations, contact 109 engages brush 114. This closes switch CS3 which causes shaft 11*a* and rotating dispenser 11 to be indexed to step the next chip recess 34 into the dispensing position.

At the same time switch CS3 activates motor 74 to rotate excentric cam 75 in the placement means for the remaining ½ revolution causing vacuum probe 19 to move in the "down-up" stroke (FIG. 3B) necessary to deposit its retained positioned chip on substrate 21. At the end of the down stroke or after about a ¼ revolution of motor 74, switch CS3A is closed. This removes the vacuum from probe 19 and permits the probe to deposit the retained chip onto substrate 21.

After the stopped table has begun to rotate again, moving contact 109 engages brush 115 to close switch CS4 which causes servomotors 71, 72 and 73 to return to their starting positions or their original position before the pulse counts were applied to them from the storage means. This in turn moves platform 83 and vacuum probe 19 to their initial orientation positions.

Then, when the table has made its next stop at the alternative condition wherein the three radial chip retaining arms 31, 32 and 33 are at the three stations, the next commutator contact 111 engages brush 112 to commence the repetition of the entire series of operations. Thus, the series of operations continues to be repeated as long as shaft 30 and table 14 continue to rotate.

While the invention has been particularly shown and described with reference to the preferred embodiments thereof, it will be understood by those skilled in the art that various changes in form and details may be made therein without departing from the spirit and scope of the invention.

What is claimed is:

1. Apparatus for conveying an article to a substrate and for placing said article on said substrate in a preselected translational and rotary orientation comprising:

conveying means for receiving the article from an article dispensing means and conveying the received article to article placement means;

sensing means intermediate said dispensing means and said placement means for sensing the deviation in the initial existing orientation of said conveyed article from said preselected orientation and generating a signal indicative of said deviation in orientation;

article placement means for transferring said sensed article from said conveying means to said substrate having supporting means capable of retaining said article in its initial orientation with respect to said placement means; and positioning means responsive to a signal from said sensing means indicative of said deviation in orientation for moving the placement means to bring the retained article which is movable therewith into the preselected orientation prior to the placement of the article on the substrate.

2. The apparatus of claim 1 wherein said sensing means are optical sensing means.

3. The apparatus of claim 2 wherein the conveying means are rotary.

4. Apparatus for conveying an article to a substrate and for placing said article on said substrate in a preselected translational and rotary orientation comprising:

a rotatable table and means for indexing said table through a series of stops at fixed angular increments including stops at an article dispensing station to receive said article, an intermediate sensing station and an article placement station;

means at said sensing station for sensing the deviation in the initial existing orientation of said conveyed article from said preselected orientation and generating a signal indicative of said deviation in orientation;

article placement means at said placement station for transferring the sensed article from said table to said substrate having supporting means capable of retaining said article in its initial orientation with respect to said placement means; and positioning means responsive to a signal from said sensing means indicative of said deviation in orientation for moving the placement means to bring the retained article which is movable therewith into the preselected orientation prior to the placement of the article on the substrate.

5. The apparatus of claim 4 wherein said sensing means are optical sensing means.

6. The apparatus of claim 4 wherein said rotatable table has means for retaining the conveyed article in a fixed position.

7. The apparatus of claim 4 wherein said rotatable table has means for retaining a rectangle shaped article in a fixed position on the surface of said table.

8. The apparatus of claim 7 wherein said retaining means comprises an abutment formed by a pair of walls at right angles and spring means for urging one corner of the rectangle against the abutment.

9. The apparatus of claim 1 wherein said article placement means are vacuum means.

10. The apparatus of claim 1 wherein said supporting means are vacuum means adapted to remove said article from said conveying means, to retain said article in a fixed position with respect to said vacuum means and to release said article onto said substrate.

11. Apparatus for conveying an article to a substrate and for placing said article on said substrate in a preselected translational and rotary orientation comprising:

a rotatable table and means for indexing said table through a series of stops at fixed angular increments including stops at an article dispensing station to receive said article, an intermediate sensing station and an article placement station;

optical sensing means at said sensing station for sensing the deviation in the initial existing orientation of said conveyed article from said preselected orientation and generating a signal indicative of said deviation in orientation;

article placement means at said placement station for transferring the sensed article from said table to said substrate having vacuum means adapted to remove said article from said conveying means, to retain said article in its initial orientation with respect to said vacuum means and to release said article onto said substrate; and positioning means responsive to a signal from said sensing means indicative of said deviation in orientation for moving the placement means to bring the retained article which is movable therewith into the preselected orientation prior to the placement of the article on the substrate.

12. The apparatus of claim 11 wherein said vacuum means are axially movable in a direction perpendicular to the table surface, and further including means for moving the vacuum means axially to remove the article from the table and to release the article onto said substrate.

13. The apparatus of claim 11 wherein the vacuum means is a vacuum probe.

14. The apparatus of claim 4 wherein a plurality of articles is received, conveyed, sensed and placed.

15. The apparatus of claim 4 wherein the table has at least one opening formed therein through which the article may be carried by the placement means to a substrate behind the table.

16. The apparatus of claim 12 wherein the table has at least one opening formed therein through which the article may be carried by the axially moving vacuum means to deposit the article on a substrate beneath the table.

17. The apparatus of claim 12 wherein said rotary table is disposed between said placement means and said substrate and has radially alternating article supporting surfaces and openings permitting the axial movement of the vacuum means therethrough and further including means synchronizing the axial movement of the vacuum means with the indexing of the table to permit the vacuum means to engage an article from a supporting surface during a stop and to place the engaged article through the alternating succeeding opening on the substrate.

18. The apparatus of claim 16 wherein the opening in the table is a peripheral opening.

19. The apparatus of claim 12 wherein the vacuum means are adapted to retain the article in such a position that the axis of the vacuum means passes through the article.

20. The apparatus of claim 12 wherein the vacuum means are movable translationally and rotationally with respect to said axis, and the means for moving the placement means move said vacuum means translationally and rotatationally to bring the retained article into the preselected orientation.

21. The apparatus of claim 2 wherein said optical sensing means are adapted to sense the respective perpendicular distances of first and second optically detectable reference points on said article from the first of a pair of optically detectable coordinate reference axes, on which first axis, said reference points are to be positioned in the preselected orientation and to sense the perpendicular distance of a third reference point on said article from the second coordinate reference axis on which second axis the third reference point is to be positioned in the preselected orientation and said optical means generate signals indicative of the three sensed distances.

22. The apparatus of claim 21 wherein said optical sensing means include means for generating an image of said article and means for scanning said image along the respective paths of the perpendiculars of the three reference points on the article image onto the respective coordinate reference axes in the image plane.

23. The apparatus of claim 22 wherein said scanning means include light sensitive means which generate the signals indicative of the three sensed distances.

24. The apparatus of claim 21 wherein said optical sensing means have

- projection means including a beam splitter for transmitting first and second images of said article in first and second optical paths respectively;
- means for scanning the first image along the paths of the perpendiculars of said first and second reference points of the article image onto the first coordinate axis in the image plane; and
- means for scanning the second image along the path of the perpendicular of the third reference point of the article image onto the second coordinate axis in the image plane.

25. The apparatus of claim 24 wherein said first and second scanning means each include:

- light sensitive means;
- a rotatable reflecting member having a planar reflecting surface for reflecting each image; and
- means for rotating said reflecting member to recurrently reflect each image along said paths to the respective light sensitive means.

26. Apparatus for placing articles on substrates in preselected translational and rotary orientations comprising:

- means for conveying substrates to a placement station;
- article placement means at said station comprising vacuum means axially movable in a direction perpendicular to the substrate and means for moving the vacuum means axially, said vacuum means being adapted to receive an article, retain the article in a fixed orientation with respect to the vacuum means and to selectively release the article onto said substrate;
- rotary conveying means for regularly interposing in the path of movement of said vacuum means toward said substrate the articles which are received by said vacuum means; and
- positioning means for moving the placement means in plane parallel to said substrate to bring the retained article into the preselected orientation prior to the placement of the article on the substrate.

27. The apparatus of claim 26 wherein said rotary conveying means is a rotary table disposed between said placement means and said substrate having radially alternating article supporting surfaces and openings permitting therethrough the axial movement of the vacuum means and means synchronizing the movement of the rotary conveying means and the axial movement of the vacuum means to permit the receiving and the placement of the articles by the vacuum means.

28. Apparatus for placing articles on substrates in preselected translation and rotary orientations comprising:

- article placement means including;
- vacuum means axially reciprocatable in a direction perpendicular to the substrate and means for reciprocating said vacuum means, said vacuum means being adapted to pick up an article, retain the article in a fixed orientation with respect to the vacuum means and to selectively deposit the article onto the substrate;
- a rotary table disposed between said placement means and substrate along said path of reciprocation and having radially alternating article supporting surfaces and openings permitting therethrough the reciprocating vacuum means;
- means for rotating said table in synchronization with said reciprocating vacuum means whereby the vacuum means on successive reciprocations engages and receives an article on a supporting surface of the table and alternately passes through an opening in the table to deposit the article on the substrate; and
- positioning means for moving the placement means in a plane parallel to said substrate to bring a received article into the preselected orientation prior to placement of the article on the substrate.

29. The apparatus of claim 28 wherein the rotary table is indexed to stop each article supporting surface at said reciprocation path to permit the vacuum means to receive the article.

30. Apparatus for placing semiconductor chips on assemblies in preselected translational and rotary orientation comprising:

- a chip placement station;
- chip dispensing means;
- means for successively receiving chips from said dispensing means and successively conveying the received chips to the chip placement station;
- optical sensing means intermediate said dispensing means and said placement station for sensing the deviation in the existing orientation of each conveyed chip from said preselected orientation and generating a signal indicative of said deviation in orientation;
- chip placement means at said placement station for successively transferring the sensed chip from said conveying means to the assembly having supporting means capable of retaining each chip in its initial orientation with respect to said placement means; and
- positioning means responsive to a signal from said sensing means indicative of the deviation in orientation of the retained chip for moving the placement means to bring the retained chip which is movable therewith into the preselected orientation prior to placement of the chip on the assembly.

31. Apparatus for positioning semiconductor chips on assemblies in preselected translational and rotary orientation comprising:

- a chip dispensing station;
- a chip placement station;
- a rotatable table and means for indexing said table through a series of stops at fixed angular increments including stops at said dispensing station to successively receive chips, at said placement station and at a sensing station intermediate said dispensing and placement station;
- optical means at said sensing station for sensing the deviation in the initial orientation of each conveyed chip from said preselected orientation and generating a signal indicative of said deviation in orientation;
- chip placement means at said placement station for successively transferring the sensed chip from said rotary table to the assembly having supporting means capable of retaining each chip in its initial orientation with respect to said placement means; and positioning means responsive to a signal from said sensing means indicative of the deviation in orientation of the retained chip for moving the placement means to bring the retained chip which is movable therewith into the preselected orientation prior to placement of the chip on the assembly.

32. The apparatus of claim 29 wherein the rotatable table has means for retaining a plurality of chips in fixed positions separated by angular increments corresponding to the angular increments of the table stops.

33. The apparatus of claim 32 wherein the chips are rectangular and said retaining means comprise an abutment formed by a pair of walls at right angles and spring means for urging one corner of the rectangular chip against the abutment.

References Cited

UNITED STATES PATENTS

| | | | |
|---|---|---|---|
| 3,198,311 | 8/1965 | Lajoie | 198—33 |
| 3,312,325 | 4/1967 | Beck et al. | 198—33 |
| 3,337,941 | 8/1967 | Drop | 228—6 X |
| 3,344,900 | 10/1967 | Drop. | |
| 3,367,476 | 2/1968 | Aronstein et al. | 198—33 |

THOMAS H. EAGER, Primary Examiner

U.S. Cl. X.R.

29—208; 198—33